US008952624B2

(12) United States Patent
Kim et al.

(10) Patent No.: US 8,952,624 B2
(45) Date of Patent: Feb. 10, 2015

(54) LIGHT EMITTING DIODE LIGHTING SYSTEM

(75) Inventors: Young Jong Kim, Seoul (KR); Dong Young Huh, Seoul (KR); Taek Soo Kim, Seoul (KR); Hyun Shik Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/000,863

(22) PCT Filed: Oct. 10, 2011

(86) PCT No.: PCT/KR2011/007485
§ 371 (c)(1),
(2), (4) Date: Nov. 4, 2013

(87) PCT Pub. No.: WO2012/115321
PCT Pub. Date: Aug. 30, 2012

(65) Prior Publication Data
US 2014/0312806 A1   Oct. 23, 2014

(30) Foreign Application Priority Data
Feb. 21, 2011   (KR) .................. 10-2011-0015146

(51) Int. Cl.
H05B 41/16   (2006.01)

(52) U.S. Cl.
USPC ........ 315/247; 315/278; 315/185 S; 315/291; 315/312

(58) Field of Classification Search
USPC ................. 315/247, 224, 225, 274–289, 291, 315/307–326, 185 S
See application file for complete search history.

(56) References Cited

U.S. PATENT DOCUMENTS

| 2008/0284346 | A1 | 11/2008 | Lee |
| 2009/0034301 | A1 | 2/2009 | Chou |
| 2012/0056551 | A1* | 3/2012 | Zhu et al. ............ 315/232 |

FOREIGN PATENT DOCUMENTS

| JP | 2003-164149 A | 6/2003 |
| JP | 2004-282896 A | 10/2004 |
| JP | 2005-011739 A | 1/2005 |

OTHER PUBLICATIONS

International Search Report for International Application No. PCT/KR2011/007485.

*Primary Examiner* — Tuyet Thi Vo
(74) *Attorney, Agent, or Firm* — LRK Patent Law Firm

(57) ABSTRACT

An LED lighting system is provided. The LED lighting system includes a main transformer, a voltage detector, a current controller, a second reference voltage supplier, and a power factor compensation circuit. The main transformer transforms an input signal to supply the transformed input signal to an LED group. The voltage detector supplies a control voltage proportional to a level of an input voltage corresponding to the input signal. The current controller includes a first voltage storage, a negative voltage applier, a second voltage storage, switch, and a current control signal generator. The first voltage storage stores the control voltage supplied from the voltage detector or discharges a stored voltage. The negative voltage applier is connected to the first voltage storage, and connected to a ground to apply the control voltage to the ground when the control voltage is a negative voltage. The second voltage storage is connected to the first voltage storage, and stores the control voltage applied through the first voltage storage or discharges a stored voltage. The switch is connected to the second voltage storage, and activated by a driving signal to apply a ground voltage to the second voltage storage. The current control signal generator generates a current control signal according to a voltage signal and gain of the second voltage storage. The first voltage storage or the second voltage storage supplies the current control signal through the voltage detector. The second reference voltage supplier supplies the second reference voltage when the control signal supplied from the voltage detector is equal to or greater than the second reference voltage. The power factor compensation circuit controls a duty ratio of the driving signal according to a level of the current control signal, and controls a peak value of a primary current in the main transformer according to a level of the second reference voltage.

20 Claims, 4 Drawing Sheets

Fig. 2
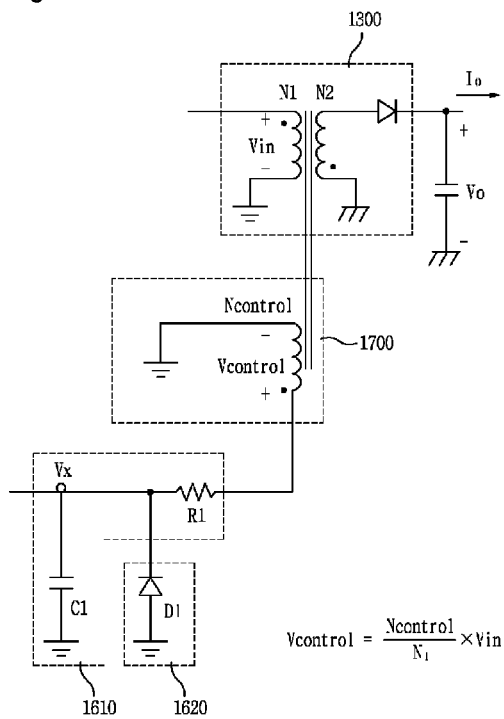
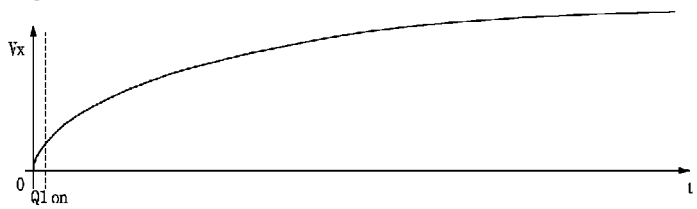
Fig. 3
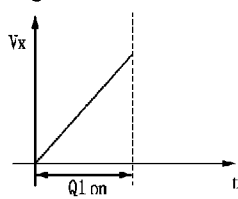
Fig. 4

$$V_{control} = \frac{N_{control}}{N_2} \times V_o$$

LIGHT EMITTING DIODE LIGHTING SYSTEM

TECHNICAL FIELD

The present disclosure relates to a Light Emitting Diode (LED) lighting system.

BACKGROUND ART

Generally, since LEDs are semiconductor devices, LEDs have long service life, fast lighting speed, low consumption power, and excellent color reproductivity.

Moreover, LEDs are robust to impact, and it is easy to miniaturize and thin LEDs.

Therefore, lighting systems with LEDs are recently being introduced, and research is continuously being conducted on an LED lighting system that more effectively controls the amount of a current supplied to LEDs.

DISCLOSURE OF INVENTION

Technical Problem

Embodiments provide an LED lighting system which controls a peak value of a primary current in a transformer circuit supplying a current to LEDs, thus efficiently controlling the amount of a current supplied to the LEDs.

Solution to Problem

In one embodiment, a Light Emitting Diode (LED) lighting system includes: a main transformer transforming an input signal to supply the transformed input signal to an LED group; a voltage detector supplying a control voltage proportional to a level of an input voltage corresponding to the input signal; a current controller including: a first voltage storage storing the control voltage supplied from the voltage detector or discharging a stored voltage; a negative voltage applier connected to the first voltage storage, and connected to a ground to apply the control voltage to the ground when the control voltage is a negative voltage; a second voltage storage connected to the first voltage storage, and storing the control voltage applied through the first voltage storage or discharging a stored voltage; a switch connected to the second voltage storage, and activated by a driving signal to apply a ground voltage to the second voltage storage; and a current control signal generator generating a current control signal according to a voltage signal and gain of the second voltage storage, wherein the first voltage storage or the second voltage storage supplies the current control signal through the voltage detector; a second reference voltage supplier supplying the second reference voltage when the control signal supplied from the voltage detector is equal to or greater than the second reference voltage; and a power factor compensation circuit controlling a duty ratio of the driving signal according to a level of the current control signal, and controlling a peak value of a primary current in the main transformer according to a level of the second reference voltage.

In another embodiment, an LED lighting system includes: a main transformer transforming an input signal to supply the transformed input signal to an LED group; a voltage detector supplying a control voltage proportional to a level of an input voltage corresponding to the input signal; a current controller including: a first voltage storage storing the control voltage supplied from the voltage detector or discharging a stored voltage; a negative voltage applier connected to the first voltage storage, and connected to a ground to apply the control voltage to the ground when the control voltage is a negative voltage; a second voltage storage connected to the first voltage storage, and storing the control voltage applied through the first voltage storage or discharging a stored voltage; and a switch connected to the second voltage storage, and activated by a driving signal to apply a ground voltage to the second voltage storage, wherein the first voltage storage or the second voltage storage supplies the current control signal through the voltage detector; a second reference voltage supplier supplying the second reference voltage when the control signal supplied from the voltage detector is equal to or greater than the second reference voltage; and a power factor compensation circuit controlling a duty ratio of the driving signal according to a level of the current control signal, and controlling a peak value of a primary current in the main transformer according to a level of the second reference voltage.

In further another embodiment, an LED lighting system includes: a main transformer transforming an input signal to supply the transformed input signal to an LED group; an auxiliary transformer supplying a source voltage proportional to a level of a transformed input signal which is supplied from the main transformer; a current detector sensing a current supplied to the LED group to supply a current control signal; a second reference voltage supplier supplying the second reference voltage when the source voltage supplied from the auxiliary transformer is equal to or greater than the second reference voltage; and a power factor compensation circuit controlling a duty ratio of the driving signal according to a level of the current control signal, and controlling a peak value of a primary current in the main transformer according to a level of the second reference voltage.

Advantageous Effects of Invention

The LED lighting system according to embodiments controls the peak value of the primary current in the transformer circuit supplying a current to the LEDs, thus efficiently controlling the amount of a current supplied to the LEDs.

BRIEF DESCRIPTION OF DRAWINGS

FIG. 2 is a circuit diagram illustrating a case where a main switch of an LED lighting system according to an embodiment is turned on.

FIG. 3 is a graph showing voltage characteristic of a first capacitor when a main switch of an LED lighting system according to an embodiment is turned on.

FIG. 4 is an enlarged graph showing voltage characteristic of a first capacitor when a main switch of an LED lighting system according to an embodiment is turned on.

FIG. 5 is a circuit diagram illustrating a case where a main switch of an LED lighting system according to an embodiment is turned on.

MODE FOR THE INVENTION

Figure 1:
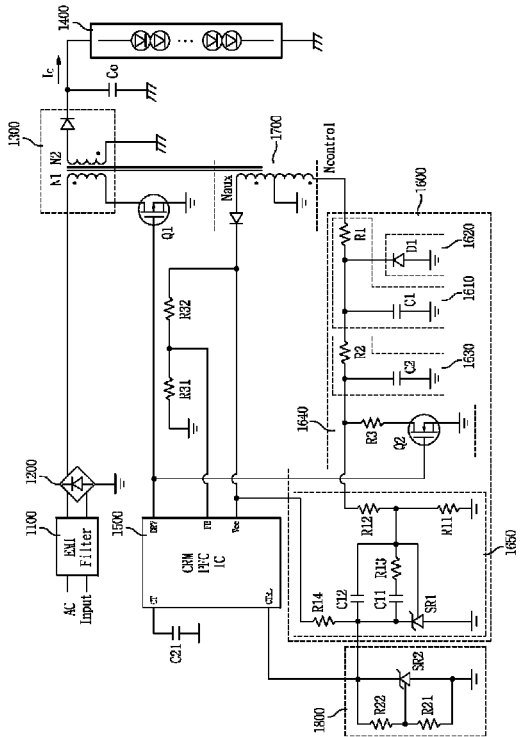
FIG. 1 is a circuit diagram illustrating an LED lighting system according to an embodiment.

Hereinafter, exemplary embodiments of the inventive concept will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

FIG. 1 is a circuit diagram illustrating an LED lighting system according to an embodiment.

Referring to FIG. 1, in an LED lighting system according to an embodiment, when an Alternating Current (AC) input voltage is applied to an electromagnetic interference (EMI) filter 1100 and has passed through a bridge circuit 1200, a rectified voltage Vin is applied to a main transformer 1300.

The main transformer 1300 transforms an input signal to supply the transformed input signal to a LED group 1400.

That is, the main transformer 1300 transforms the rectified voltage Vin to supply the transformed rectified voltage Vin to the LED group 1400.

The voltage detector 1700 supplies a control voltage proportional to the level of an input voltage corresponding to the input signal.

That is, when the voltage detector 1700 delivers the control signal proportional to the level of the rectified voltage Vin to the current controller 1600, a first voltage storage 1610 or second voltage 1630 of the current controller 1600 supplies a current control signal CTRL, which is proportional to a constant current applied to an LED, to a power factor compensation circuit 1500.

Moreover, a second reference voltage supplier 1800 applies a second reference voltage to the power factor compensation circuit 1500 when the control signal supplied from the current controller 1600 is equal to or higher than the second reference voltage.

When the current control signal CTRL is supplied to the power factor compensation circuit 1500, the power factor compensation circuit 1500 controls a duty ratio of a driving signal DRV according to the level of the current control signal CTRL to control the level of the constant current applied to the LED group 1400, and controls a peak value of a primary current of the main transformer 1300 according to the level of the second reference voltage to efficiently control the amount of a current applied to the LED group 1400. Herein, resistors R21 and R22 control the level of the current control signal CTRL and apply the level-controlled signal to the power factor compensation circuit 1500.

As illustrated in FIG. 1, the current controller 1600 may include a first voltage storage 1610, a negative voltage applier 1620, a second voltage storage 1630, a switch 1640, and a current control signal generator 1650.

The first voltage storage 1610 stores a control signal that is delivered in proportion to the level of the rectified voltage Vin or discharges a stored voltage. The first voltage storage 1610 includes a first resistor R1 and a first capacitor C1.

Herein, a time constant of the first resistor R1 and first capacitor C1 may be greater than a turn-on time of the driving signal DRV, and a control voltage Vcontrol may control the time constant in proportion to the level of the rectified voltage Vin by adjusting a turns ration of the main transformer 1300 and voltage detector 1700.

The negative voltage applier 1620 is connected to the first voltage storage 1610, and includes a diode D1 having an anode connected to a ground. When the control voltage Vcontrol is a negative voltage, the negative voltage applier 1620 is connected to the ground to apply the control voltage Vcontrol to the ground.

The second voltage storage 1630 is connected to the first voltage storage 1610, and includes a second resistor R2 and a second capacitor C2. The second voltage storage 1630 stores the control voltage Vcontrol that is applied through the first voltage storage 1610 or discharges a stored voltage.

The switch 1640 is connected to the second voltage storage 1630, and includes metal-oxide semiconductor (MOS) transistor Q2 or a bipolar junction transistor (BJT, not shown). The switch 1640 is activated by the driving signal DRV to apply a ground voltage to the second voltage storage 1630. Herein, a resistor R3 is for removing a portion of a voltage signal, stored in the first capacitor C1, corresponding to a time when a main switch Q1 is turned on, and is required to be appropriately controlled.

Moreover, the current control signal generator 1650 generates the current control signal CTRL according to a voltage and gain of the second voltage storage 1630. The current control signal generator 1650 may include a first shunt regulator SR1, and eleventh and twelfth resistors R11 and R12 for sensing the second voltage storage 1630.

Herein, a resistor R14 is for preventing a voltage to be excessively applied to the first shunt regulator SR1, Capacitors C11 and C12 and a resistor R13 correspond to a gain of a controller (not shown).

The second reference voltage supplier 1800 supplies the second reference voltage to the power factor compensation circuit 1500 when the current control signal supplied from the current control signal generator 1650 is equal to or greater than the second reference voltage. The second reference voltage supplier 1800 may include a second shunt regulator SR2, and twenty-first and twenty-second resistors R21 and R22 for controlling the level of the second reference voltage. The second reference voltage supplier 1800 may be configured with a second Zener diode (not shown).

When the current control signal is equal to or greater than the second reference voltage, the second shunt regulator SR2 is turned on and applies the second reference voltage to the power factor compensation circuit 1500. Since the amount of a current applied to the MOS transistor Q1 cannot increase to higher than a certain amount, the power factor compensation circuit 1500 may restrict the peak value of the primary current in the main transformer 1300 to less than a certain value. When the current control signal is less than the second reference voltage, the power factor compensation circuit 1500 is turned off, and thus does not affect the amount of the current applied to the MOS transistor Q1.

Hereinafter, a case where the main switch Q1 is turned on will be described in detail with reference to FIGS. 2 to 4.

When the main switch Q1 is turned on, the control voltage Vcontrol proportional to the rectified voltage Vin becomes a positive voltage, and thus, the negative voltage applier 1620 is turned off and the control voltage Vcontrol is applied to the first voltage storage 1610.

An upper voltage Vx of the first capacitor C1 is shifted as in FIG. 3, but when the time constant of the first resistor R1 and first capacitor C1 is sufficiently greater than the turn-on time of the driving signal DRV, as shown in FIG. 4, the upper voltage Vx is shown as almost linearly increasing.

Figure 5:
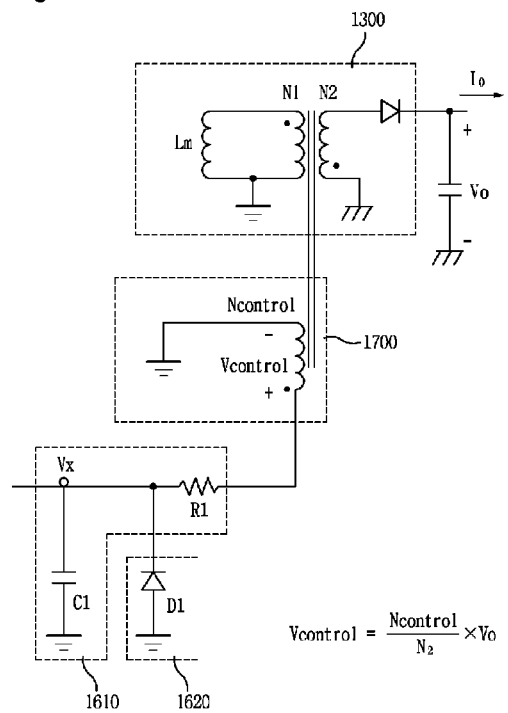

Hereinafter, a case where the main switch Q1 is turned off will be described in detail with reference to FIGS. 5 to 6.

When the main switch Q1 is turned off, the control voltage Vcontrol becomes a negative voltage. Therefore, the negative voltage applier 1620 is turned on, and thus, the control voltage Vcontrol is not applied to the first voltage storage 1610 but is applied to the ground through the negative voltage applier 1620.

Figure 6:
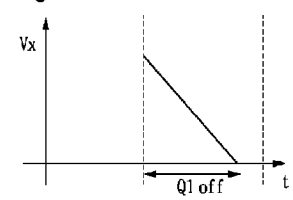
FIG. 6 is a graph showing voltage characteristic of a first capacitor when a main switch of an LED lighting system according to an embodiment is turned off.

Therefore, the upper voltage Vx of the first capacitor C1 stored in the first voltage storage 1610 is discharged as in FIG. 6.

An LED lighting system according to another embodiment will be described below with reference to FIG. 7. In describing the LED lighting system according to another embodiment, however, only a difference between the LED lighting system according to an embodiment and the LED lighting system according to another embodiment will be described below.

Figure 7:
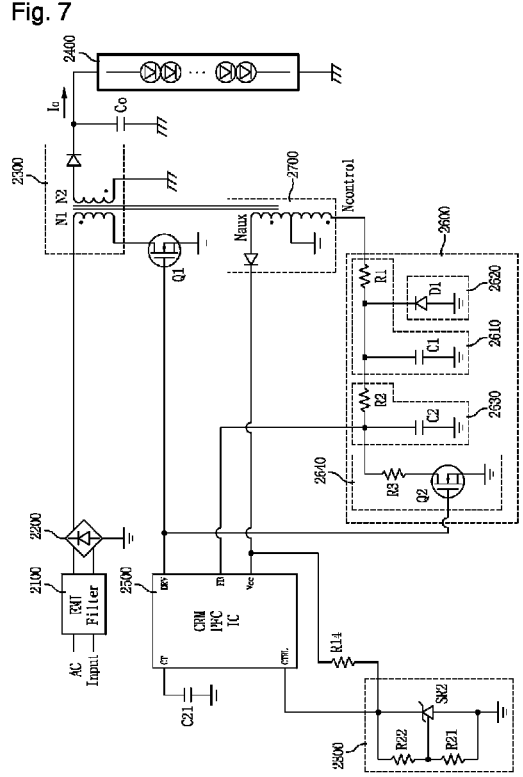
FIG. 7 is a circuit diagram illustrating an LED lighting system according to another embodiment.

FIG. 7 is a circuit diagram illustrating an LED lighting system according to another embodiment.

Referring to FIG. 7, an LED lighting system according to another embodiment includes a current controller 2600 and a voltage detector 2700. The current controller 2600 includes a first voltage storage 2610, a negative voltage applier 2620, a second voltage storage 2630, and a switch 2640. Herein, the first voltage storage 2610 stores a control voltage supplied from the voltage detector 2700 or discharges a stored voltage. The negative voltage applier 2620 is connected to the first voltage storage 2610, and is connected to a ground to apply the control voltage to the ground when the control voltage is a negative voltage. The second voltage storage 2630 is connected to the first voltage storage 2610, and stores the control voltage applied through the first voltage storage 2610 or discharges a stored voltage. The switch 2640 is connected to the second voltage storage 2630, and is activated by a driving signal to apply a ground voltage to the second voltage storage 2630.

An LED lighting system according to yet another embodiment will be described below with reference to FIG. 8. In describing the LED lighting system according to yet another embodiment, however, only a difference between the LED lighting system according to another embodiment and the LED lighting system according to yet another embodiment will be described below.

Figure 8:
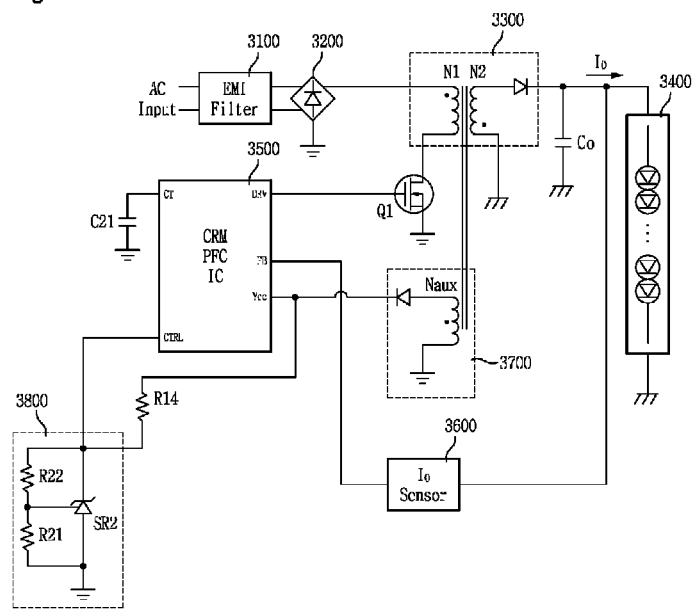
FIG. 8 is a circuit diagram illustrating an LED lighting system according to yet another embodiment.

FIG. 8 is a circuit diagram illustrating an LED lighting system according to yet another embodiment.

Referring to FIG. 8, the LED lighting system according to yet another embodiment includes a main transformer 3300 an LED group 3400, a current detector 3600, an auxiliary transformer 3700, and a second reference voltage supplier 3800. Herein, the current detector 3600 senses a current supplied to the LED group 3400 to supply a current control signal. The auxiliary transformer 3700 supplies a source voltage proportional to the level of a transformed input signal that is applied from the main transformer 3300. The second reference voltage supplier 3800 supplies a second reference voltage when the source voltage applied from the auxiliary transformer 3700 is equal to or greater than the second reference voltage. Furthermore, the current detector 3600 may include a resistor, a shunt regulator (or Zener diode), and a photo coupler when a primary side are insulated from a secondary side.

As described above, the LED lighting system according to embodiments controls the peak value of the primary current in the transformer circuit supplying a current to the LEDs, thus efficiently controlling the amount of a current supplied to the LEDs.

In the embodiments, the above-described features, structures, and effects are included in at least one embodiment, but are not necessarily limited to one embodiment. Furthermore, the features, structures, and effects that have exemplified in each embodiment may be combined or modified by those skilled in the art and implemented. Therefore, it should be construed that contents related to the combination and modification are included in the spirit and scope of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A Light Emitting Diode (LED) lighting system comprising:
a main transformer transforming an input signal to supply the transformed input signal to an LED group;
a voltage detector supplying a control voltage proportional to a level of an input voltage corresponding to the input signal;
a current controller comprising: a first voltage storage storing the control voltage supplied from the voltage detector or discharging a stored voltage; a negative voltage applier connected to the first voltage storage, and connected to a ground to apply the control voltage to the ground when the control voltage is a negative voltage; a second voltage storage connected to the first voltage storage, and storing the control voltage applied through the first voltage storage or discharging a stored voltage; a switch connected to the second voltage storage, and activated by a driving signal to apply a ground voltage to the second voltage storage; and a current control signal generator generating a current control signal according to a voltage signal and gain of the second voltage storage, wherein the first voltage storage or the second voltage storage supplies the current control signal through the voltage detector;
a second reference voltage supplier supplying the second reference voltage when the control signal supplied from the voltage detector is equal to or greater than the second reference voltage; and
a power factor compensation circuit controlling a duty ratio of the driving signal according to a level of the current control signal, and controlling a peak value of a primary current in the main transformer according to a level of the second reference voltage.

2. The LED lighting system according to claim 1, wherein the first voltage storage comprises a first resistor and a first capacitor.

3. The LED lighting system according to claim 1, wherein the negative voltage applier comprises a diode having an anode connected to the ground.

4. The LED lighting system according to claim 1, wherein the second voltage storage comprises a second resistor and a second capacitor.

5. The LED lighting system according to claim 1, wherein the switch comprises a MOS transistor or a bipolar junction transistor.

6. The LED lighting system according to claim 1, wherein the current control signal generator comprises a first shunt regulator.

7. The LED lighting system according to claim 1, wherein the second reference voltage supplier comprises a second shunt regulator.

8. The LED lighting system according to claim 1, wherein the second reference voltage supplier comprises twenty-first and twenty-second resistors for controlling the level of the second reference voltage.

9. The LED lighting system according to claim 1, wherein the second reference voltage supplier comprises a second Zener diode.

10. A Light Emitting Diode (LED) lighting system comprising:
- a main transformer transforming an input signal to supply the transformed input signal to an LED group;
- a voltage detector supplying a control voltage proportional to a level of an input voltage corresponding to the input signal;
- a current controller comprising: a first voltage storage storing the control voltage supplied from the voltage detector or discharging a stored voltage; a negative voltage applier connected to the first voltage storage, and connected to a ground to apply the control voltage to the ground when the control voltage is a negative voltage; a second voltage storage connected to the first voltage storage, and storing the control voltage applied through the first voltage storage or discharging a stored voltage; and a switch connected to the second voltage storage, and activated by a driving signal to apply a ground voltage to the second voltage storage, wherein the first voltage storage or the second voltage storage supplies the current control signal through the voltage detector;
- a second reference voltage supplier supplying the second reference voltage when the control signal supplied from the voltage detector is equal to or greater than the second reference voltage; and
- a power factor compensation circuit controlling a duty ratio of the driving signal according to a level of the current control signal, and controlling a peak value of a primary current in the main transformer according to a level of the second reference voltage.

11. The LED lighting system according to claim 10, wherein the first voltage storage comprises a first resistor and a first capacitor.

12. The LED lighting system according to claim 10, wherein the negative voltage applier comprises a diode having an anode connected to the ground.

13. The LED lighting system according to claim 10, wherein the second voltage storage comprises a second resistor and a second capacitor.

14. The LED lighting system according to claim 10, wherein the switch comprises a MOS transistor or a bipolar junction transistor.

15. The LED lighting system according to claim 10, wherein the second reference voltage supplier comprises a second shunt regulator.

16. The LED lighting system according to claim 10, wherein the second reference voltage supplier comprises twenty-first and twenty-second resistors for controlling the level of the second reference voltage.

17. The LED lighting system according to claim 10, wherein the second reference voltage supplier comprises a second Zener diode.

18. A Light Emitting Diode (LED) lighting system comprising:
- a main transformer transforming an input signal to supply the transformed input signal to an LED group;
- an auxiliary transformer supplying a source voltage proportional to a level of a transformed input signal which is supplied from the main transformer;
- a current detector sensing a current supplied to the LED group to supply a current control signal;
- a second reference voltage supplier supplying the second reference voltage when the source voltage supplied from the auxiliary transformer is equal to or greater than the second reference voltage; and
- a power factor compensation circuit controlling a duty ratio of the driving signal according to a level of the current control signal, and controlling a peak value of a primary current in the main transformer according to a level of the second reference voltage.

19. The LED lighting system according to claim 18, wherein the second reference voltage supplier comprises a second shunt regulator.

20. The LED lighting system according to claim 18, wherein the second reference voltage supplier comprises twenty-first and twenty-second resistors for controlling the level of the second reference voltage.

* * * * *